United States Patent [19]

Frey

[11] 4,287,917
[45] Sep. 8, 1981

[54] DIAPHRAGM DEVICE FOR DAMPING VIBRATIONS IN FLOWING LIQUIDS

[75] Inventor: Günter Frey, Fellbach, Fed. Rep. of Germany

[73] Assignee: Knecht Filterwerke GmbH, Stuttgart, Fed. Rep. of Germany

[21] Appl. No.: 92,327

[22] Filed: Nov. 8, 1979

[30] Foreign Application Priority Data

Nov. 17, 1978 [DE] Fed. Rep. of Germany ....... 2849925
Nov. 17, 1978 [DE] Fed. Rep. of Germany ....... 2849926

[51] Int. Cl.³ .......................................... F16L 55/04
[52] U.S. Cl. .................................... 138/30; 137/857; 210/136; 210/349; 210/446
[58] Field of Search ............. 210/168, 348, 349, 446, 210/136, 97, 130, 137; 137/843, 857; 138/30, 46; 220/85 B

[56] References Cited

U.S. PATENT DOCUMENTS

| | | | |
|---|---|---|---|
| 3,072,258 | 1/1963 | Saxby | 210/349 |
| 3,333,604 | 8/1967 | Birdwell | 138/30 |
| 3,334,747 | 8/1967 | Niccum et al. | 210/446 |
| 3,355,021 | 11/1967 | Jones | 210/446 |
| 3,366,144 | 1/1968 | Durst | 138/30 |
| 3,473,565 | 10/1969 | Blendermann | 138/30 |
| 3,473,664 | 10/1969 | Hultgren | 210/136 |
| 3,498,321 | 3/1970 | Barrett et al. | 137/843 |
| 3,640,390 | 2/1972 | Goy et al. | 210/136 |
| 3,693,651 | 9/1972 | Gifford | 137/843 |
| 3,695,437 | 10/1972 | Shaltis | 210/136 |
| 3,774,764 | 11/1973 | Baldwin | 210/136 |
| 3,805,958 | 4/1974 | Campbell | 210/349 |
| 3,837,497 | 9/1974 | Smith | 210/349 |
| 3,889,710 | 6/1975 | Brost | 137/843 |
| 3,957,640 | 5/1976 | Stack | 210/136 |
| 4,222,407 | 9/1980 | Ruschke et al. | 137/843 |

*Primary Examiner*—Theodore A. Granger
*Attorney, Agent, or Firm*—Murray and Whisenhunt

[57] ABSTRACT

For the damping of high-frequency vibrations in liquids under high pressure in conduit systems there serves a diaphragm (2) loaded by a spring (3) and surrounded on all sides by the liquid of the conduit system. When the liquid is stationary the diaphragm (2) acts as barrier in a free flow cross-section of the conduit system. When the liquid is flowing the diaphragm (2) is situated in the state of suspense in which it is held by the energy of flow of the liquid against the counteracting force of the spring (3) loading the diaphragm (2). The diaphragm (2) is set in a housing (1) installed in the conduit system in such a way that the liquid on the upstream side of the diaphragm (2) flows through an annular space (6) radially around the diaphragm (2). The diaphragm (2) is especially suitable for installation in the housing (9) of a liquid filter.

3 Claims, 2 Drawing Figures

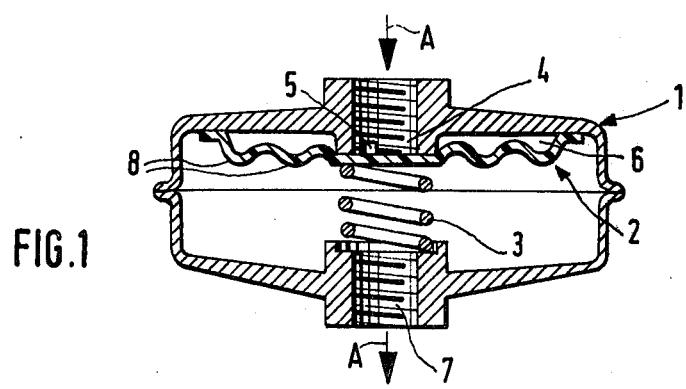
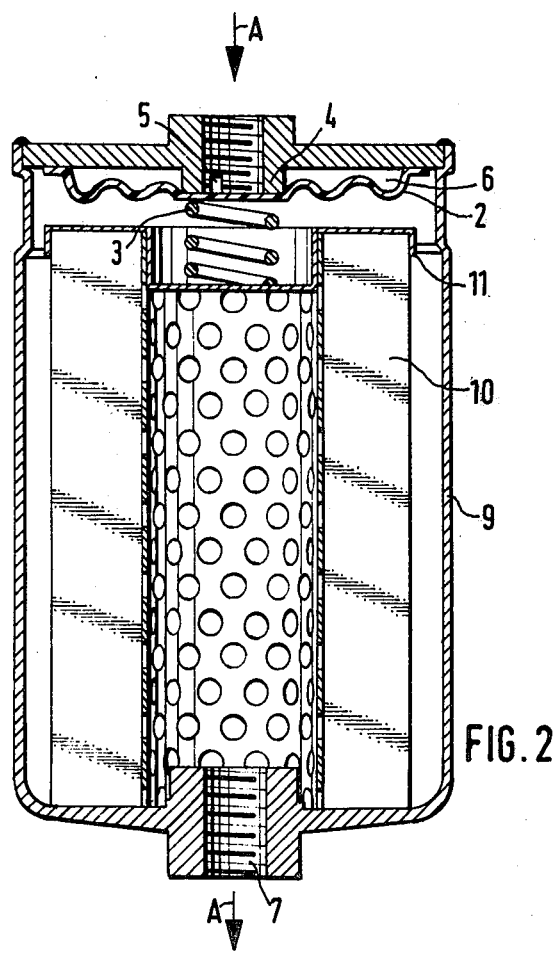

DIAPHRAGM DEVICE FOR DAMPING VIBRATIONS IN FLOWING LIQUIDS

BACKGROUND TO THE INVENTION

The invention relates to a diaphragm device for damping vibrations in flowing liquids.

STATEMENT OF PRIOR ART

For damping such vibrations in the prior art there are used for example diaphragm devices of the following assembly. The flowing vibrating liquid is directed by way of a nozzle on to a diaphragm resting on the nozzle opening, which diaphragm faces the atmosphere and is supported against the liquid pressure by a spring. Under the pressure of the liquid from the nozzle acting upon the diaphragm, which pressure is also supported by a by-pass flow issuing from the nozzle, the diaphragm clears the nozzle opening and is then held in suspension against the spring acting upon it, by the liquid current. The diaphragm seals off from atmosphere. The damping achieved with this device is in practice satisfactory. However the constructional expense which must be incurred is unsatisfactory and disadvantageous. This is true especially in the damping of vibrations in flowing liquids which are under relatively high pressure in relation to atmosphere. The invention is intended primarily to relate specifically to such cases, for in these cases both diaphragm and the spring which loads it must be of very stout formation, since both parts are subjected to the full differential pressure between liquid and atmosphere.

OBJECT OF THE INVENTION

An object of the present invention is to find a constructional simplification which renders possible the use of parts which can be subjected to low load and thus are cheap. The assembly should be such here that the diaphragm device to be provided can be inserted into housings already present in the liquid conduits, for example housings of filters, without great extra constructional expense.

SUMMARY OF THE INVENTION

According to the invention there is provided a diaphragm device for damping vibrations in liquids, comprising a spring-loaded diaphragm lying perpendicularly of the direction of the liquid flow and around which liquid flow can take place radially about its outer edge, which diaphragm can vibrate freely against the spring force when liquid flow is present.

The diaphragm device may be especially favourably suitable for installation in fuel supply systems for injection-type internal combustion engines. There by reason of a pulsating fuel delivery in the fuel pump the fuel current in fact comes into undesired vibrations which therefore must be damped. The fuel pumps used in the prior art mostly produce vibrations of quite high frequency which per se have no influence upon the function and mechanical strength of the supply system. However the vibrations issuing from the fuel in the supply system frequently make themselves unpleasantly noticeable as acoustic interference noises.

For the damping of the fuel vibrations which are the origin of such interference noises, damping devices of the kind initially described as prior art are installed in the supply system. The constructional integration of the vibration-damping diaphragm device into the housing of a filter as a rule present in the fuel conduit, as proposed in the last Sub-Claim, limits the expense to be incurred for the incorporation of a damper into the fuel conduit system to an absolute minimum of additional components. In fact only the diaphragm device according to the invention, consisting of a diaphragm and a spring loading it, is required. Since according to the proposal in accordance with the invention the diaphragm lies completely in the liquid flowing upon and around it and thus does not work against atmospheric pressure, but rather is subjected only to a slight differential pressure which is determined in the flow by the throttling action caused by the diaphragm, diaphragm and spring can be made of substantially slighter strength. Weight and production expense for the filter device are thus increased only inappreciably by the installation of the damper device.

BRIEF DESCRIPTION OF DRAWINGS

Examples of embodiment of the invention are shown in the drawing, wherein:

FIG. 1 shows a section through a diaphragm device with housing for installation of any desired point in a liquid conduit, FIG. 2 shows the section through a diaphragm device integrated into a filter housing.

DESCRIPTION OF PREFERRED EMBODIMENT

The damper device proposed in accordance with the invention is accommodated in a housing 1 which can be attached to liquid conduits. It consists essentially of a movable diaphragm 2 which is initially stressed by a helical spring 3. When no liquid current is present the diaphragm 2 lies with its outer edge on the housing 1 of the damper device and with its centre against a connector pipe 4 protruding from the housing axially into the interior of the housing. The connector pipe 4 possesses openings 5 extending axially into the annular space between diaphragm and housing wall of the damper device, through which openings, on commencement of liquid flow, the liquid firstly fills the annular space 6 with liquid and thus effects the necessary pressure for the displacement of the diaphragm 2 against the helical spring 3. In accordance with the invention the spring force of the helical spring 3 is designed so that in the case of a liquid pressure acting only through the entry opening of the connector pipe 4 the diaphragm 2 is not yet displaced in the direction of opening of the connector pipe opening 4 closed by the diaphragm 2. During the liquid flow the diaphragm 2 is situated completely in a state of suspension and rests only against the helical spring 3. The liquid flows through the damper device in the direction of the arrow A. The liquid passes over the outer edge of the diaphragm 2 to the exit opening 7 of the damper device. The diaphragm 2 is so elastic on its radial circumference that it can oscillate not only against the force of the helical spring 3 but also in itself. The necessary inherent elasticity can be achieved especially favourably by the provision of concentric circular corrugations 8 in the diaphragm 2. The free state of suspension of the diaphragm 2 effects the desired damping of the vibrating liquid flowing through the damper device quite satisfactorily. This applies especially to high-frequency vibrations in liquids such as are exerted for example by liquid pumps upon the pumped liquid. A comparison of the damping effect achieved with the device according to the invention with that with the device as described as prior art, carried out in experiments, has shown that with the device according to the invention at least an equally good result but mostly a better result is achievable. In comparison with the prior art the movable parts in the embodiment according to the invention can however be made substantially slighter as regards strength, since here the liquid pressure over atmospheric pressure is not applied, but only a slight pressure difference in the liquid flow has to be overcome.

In the example according to FIG. 2 the diaphragm device according to the invention is installed in a filter housing.

In the filter housing 9, through which flow takes place in the direction of the arrows A, there lies a filter cartridge 10 through which flow takes place from the exterior inwards. The filter cartridge 10 is closed off at its upstream end by an end plate 11. Between end plate 11 and upstream end wall of the filter housing 9 the damper device proposed in accordance with the invention is situated. As in the first example it consists of a movable diaphragm 2 which is initially stressed by a helical spring 3. The function of the diaphragm device corresponds to that in the first example.

I claim:

1. A liquid flow damping device comprising a housing (1) a liquid inlet opening (4) in said housing, said housing having an end wall extending outwardly from the inlet opening and an annular seating at the inner side of the inlet opening, said housing having a peripheral wall at the periphery of the end wall, a diaphragm free from openings within its periphery, said diaphragm having its peripheral margin adapted to seat on said end wall and spaced from said peripheral wall, said diaphragm being adapted to seat at a central part thereof as a valve plate against said annular seating to close said inlet opening in which condition there is a liquid space (6) between the diaphragm and said end wall disposed radially between said central part and the periphery of the diaphragm, an opening (5) leading from said inlet opening to said space, a spring engaging said central part of the diaphragm on its downstream side to urge it against said annular seating, support means for the spring, an outlet opening in said housing (7), said diaphragm being sufficiently flexible to oscillate at its periphery and permit flow of liquid only when liquid current commences, said central part of the diaphragm lifting off said seating under liquid pressure said spring permitting the central part of the diaphragm to vibrate off, said annular seating against the force of said opening when liquid flow occurs.

2. A liquid flow damping device according to claim 1, wherein the diaphragm is provided with concentric circular corrugations to increase its elasticity.

3. A liquid flow damping device as claimed in claim 1, wherein the housing contains a cylindrical filter cartridge and the end of the filter cartridge serves as said spring support means.

* * * * *